(12) United States Patent
Wuensche et al.

(10) Patent No.: US 11,075,423 B2
(45) Date of Patent: Jul. 27, 2021

(54) BATTERY SUBMODULE CARRIER, BATTERY SUBMODULE, BATTERY SYSTEM AND VEHICLE

(71) Applicant: SAMSUNG SDI CO., LTD., Yongin-si (KR)

(72) Inventors: Ralph Wuensche, Graz (AT); Stephan Klomberg, Graz (AT); Thomas Brandner, Rosental (AT); Thomas Renger, Hitzendorf (AT)

(73) Assignee: Samsung SDI Co., Ltd., Yongin-si (KR)

( * ) Notice: Subject to any disclaimer, the term of this patent is extended or adjusted under 35 U.S.C. 154(b) by 452 days.

(21) Appl. No.: 15/220,176

(22) Filed: Jul. 26, 2016

(65) Prior Publication Data

US 2018/0013111 A1 Jan. 11, 2018

Related U.S. Application Data (60) Provisional application No. 62/359,520, filed on Jul. 7, 2016.

(51) Int. Cl.
| | |
|---|---|
| *H01M 2/10* | (2006.01) |
| *H01M 10/613* | (2014.01) |
| *H01M 10/625* | (2014.01) |
| *H01M 10/647* | (2014.01) |
| *H01M 10/6556* | (2014.01) |

(Continued)

(52) U.S. Cl.
CPC .............. *H01M 50/20* (2021.01); *B60K 6/28* (2013.01); *B60L 50/64* (2019.02); *H01M 10/613* (2015.04); *H01M 10/625* (2015.04); *H01M 10/647* (2015.04); *H01M 10/6556* (2015.04); *H01M 50/10* (2021.01); *B60L 2240/545* (2013.01); *B60Y 2200/91* (2013.01); *B60Y 2200/92* (2013.01); *B60Y 2400/112* (2013.01);

(Continued)

(58) Field of Classification Search
CPC .. H01M 2/1077; H01M 2/0237; H01M 2/024; H01M 2/0242; H01M 2/0245
See application file for complete search history.

(56) References Cited

U.S. PATENT DOCUMENTS

| | | | |
|---|---|---|---|
| 8,409,749 | B2 | 4/2013 | Nishino et al. |
| 8,507,125 | B2 | 8/2013 | Meschter |

(Continued)

FOREIGN PATENT DOCUMENTS

| | | |
|---|---|---|
| CN | 100588001 C | 2/2010 |
| CN | 202174924 U | 3/2012 |

(Continued)

OTHER PUBLICATIONS

Japanese Office Action dated Feb. 3, 2020, for corresponding Japanese Patent Application No. 2018-568413 (6 pages).

(Continued)

*Primary Examiner* — Stephan J Essex
(74) *Attorney, Agent, or Firm* — Lewis Roca Rothgerber Christie LLP (57) ABSTRACT

A battery submodule carrier includes a monolithic cell tray configured to accommodate a plurality of aligned battery cells; a plurality of cell retainers configured to retain the battery cells within the cell tray; and a plurality of tray fasteners configured to mount the cell tray to a battery system carrier.

19 Claims, 3 Drawing Sheets

(51) Int. Cl.
  *H01M 2/02*   (2006.01)
  *B60K 6/28*   (2007.10)
  *H01M 50/20*  (2021.01)
  *B60L 50/64*  (2019.01)
  *H01M 50/10*  (2021.01)

(52) U.S. Cl.
  CPC ...... *H01M 2220/20* (2013.01); *Y10S 903/907* (2013.01)

(56) References Cited

U.S. PATENT DOCUMENTS

| | | | |
|---|---|---|---|
| 8,597,825 | B2 | 12/2013 | Buck et al. |
| 2004/0121226 | A1* | 6/2004 | Kaelin ............ H01M 2/1044 429/96 |
| 2010/0015512 | A1 | 1/2010 | Inoue et al. |
| 2011/0070478 | A1 | 3/2011 | Meschter |
| 2011/0104532 | A1 | 5/2011 | Buck et al. |
| 2011/0206967 | A1 | 8/2011 | Itsuki |
| 2012/0082875 | A1 | 4/2012 | Watanabe et al. |
| 2012/0156539 | A1 | 6/2012 | Honjo et al. |
| 2012/0263988 | A1 | 10/2012 | Obasih et al. |
| 2013/0004822 | A1 | 1/2013 | Hashimoto et al. |
| 2013/0071705 | A1 | 3/2013 | Frutschy et al. |
| 2014/0158443 | A1 | 6/2014 | Lee |
| 2014/0158444 | A1 | 6/2014 | Han et al. |
| 2014/0186683 | A1 | 7/2014 | Tyler et al. |
| 2015/0017502 | A1 | 1/2015 | Brenner et al. |
| 2015/0064542 | A1 | 3/2015 | Noh et al. |
| 2015/0069829 | A1* | 3/2015 | Dulle ............ B60L 58/12 307/9.1 |
| 2015/0280193 | A1 | 10/2015 | Ohshiba et al. |
| 2015/0303534 | A1 | 10/2015 | Obasih et al. |
| 2016/0118635 | A1* | 4/2016 | Keller ............ H01M 2/1077 429/156 |
| 2016/0190526 | A1* | 6/2016 | Yamada ............ H01M 2/1077 180/68.5 |
| 2017/0237113 | A1* | 8/2017 | Ruehle ............ H01M 2/1077 429/186 |

FOREIGN PATENT DOCUMENTS

| | | |
|---|---|---|
| CN | 102569692 A | 7/2012 |
| CN | 102856516 A | 1/2013 |
| CN | 103718374 A | 4/2014 |
| CN | 104425782 A | 3/2015 |
| CN | 105390636 A | 3/2016 |
| CN | 105552261 A | 5/2016 |
| CN | 105742531 A | 7/2016 |
| DE | 10-2011-077331 A1 | 12/2012 |
| JP | 2010-61908 A | 3/2010 |
| JP | 2011-181224 A | 9/2011 |
| JP | 2012-123917 A | 6/2012 |
| JP | 2012-128984 A | 7/2012 |
| JP | 2012-129074 A | 7/2012 |
| JP | 2012-216328 A | 11/2012 |
| JP | 2013-12441 A | 1/2013 |
| JP | 2013-12480 A | 1/2013 |
| JP | 2014-22157 A | 2/2014 |
| JP | 2016-81857 A | 5/2016 |
| KR | 0121488 Y1 | 4/1998 |
| KR | 10-2011-0011651 | 2/2011 |
| KR | 10-2013-0102964 | 9/2013 |
| KR | 10-2013-0108691 | 10/2013 |
| KR | 20130108691 A | 10/2013 |
| KR | 10-2015-0026609 | 3/2015 |
| WO | 2012/165493 A1 | 12/2012 |
| WO | WO-2012165493 A1 * | 12/2012 ........ H01M 10/647 |

OTHER PUBLICATIONS

EPO Extended Search Report dated Feb. 6, 2020, for corresponding European Patent Application No. 17824558.5 (9 pages).
Korean Notice of Allowance dated Jul. 20, 2018, for corresponding Korean Patent Application No. 10-2016-0142174 (3 pages).
Korean Office Action dated Jan. 16, 2018, for corresponding Korean Patent Application No. 10-2016-0142174 (11 pages).
European Patent Office Communication Pursuant to Article 94(3) EPC, for Patent Application No. EP 16 200 634.0, dated May 20, 2019, 8 pages.
U.S. Office Action dated May 29, 2019, issued in U.S. Appl. No. 15/642,167, 16 pages.
Notice of Allowance issued in U.S. Appl. No. 15/642,167 by the USPTO, dated Nov. 25, 2019, 10 pages.
Notice of Allowance issued in U.S. Appl. No. 15/642,167 by the USPTO, dated Apr. 22, 2020, 16 pages.
Office Action issued in U.S. Appl. No. 15/642,167 by the USPTO, dated Sep. 29, 2020, 18 pages.
EPO Office Action dated Sep. 13, 2018, for corresponding European Patent Application No. 16200634.0 (13 pages).
EPO Extended Search Report dated Sep. 8, 2017, for corresponding European Patent Application No. 16200634.0 (17 pages).
Chinese Office Action, with English translation, dated Dec. 31, 2020, for corresponding Chinese Patent Application No. 201780042273.4 (28 pages).
International Search Report and Written Opinion of the International Searching Authority dated Oct. 18, 2017, of corresponding PCT Application No. PCT/KR2017/007240, 12 pages.
Japanese Office Action dated Nov. 2, 2020, for corresponding Japanese Patent Application No. 2016-228790 (8 pages).
EPO Partial Search Report dated May 10, 2017, for corresponding European Patent Application No. 16200634.0 (20 pages).
U.S. Final Office Action dated Apr. 23, 2021, issued in U.S. Appl. No. 15/642,167 (21 pages).
Chinese Office Action, with English translation, dated Apr. 25, 2021, issued in corresponding Chinese Patent Application No. 201611063863.9 (17 pages).

\* cited by examiner

PRIOR ART

BATTERY SUBMODULE CARRIER, BATTERY SUBMODULE, BATTERY SYSTEM AND VEHICLE

CROSS-REFERENCE TO RELATED APPLICATION

This application claims the benefit of and priority to U.S. Provisional Patent Application No. 62/359,520, filed Jul. 7, 2016 in the U.S. Patent and Trademark Office, the entire content of which is incorporated herein by reference.

BACKGROUND

1. Field

Embodiments of the present invention relate to a battery submodule carrier, a battery submodule with such a battery submodule carrier, a battery system with such a battery submodule, and a vehicle with such a battery system.

2. Description of the Related Art

A rechargeable (or secondary) battery differs from a primary battery in that the former is designed to be repeatedly charged and discharged while the latter provides an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for hybrid vehicles and the like.

In general, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case in order to enable charging and discharging of the battery via an electrochemical reaction between the positive electrode, the negative electrode, and the electrolyte solution. The shape of the case, for example, a cylindrical or rectangular shape, depends on the intended purpose of the battery.

Rechargeable batteries may be used in a battery module including a plurality of unit battery cells coupled to each other in series and/or in parallel so as to provide relatively high energy density for, as an example, driving a motor of a hybrid vehicle. For example, the battery module is formed by interconnecting the electrode terminals of the plurality of unit battery cells to each other, the number of unit battery cells depending on a desired amount of power, in order to realize a relatively high-power rechargeable battery module for, as an example, an electric vehicle.

Battery modules can be constructed in a block design or in a modular design. In the block design, each battery cell is coupled to one common current collector structure and battery management system, and the batteries are arranged in a housing. In the modular design, a plurality of battery cells are connected in submodules, and several submodules are connected to each other to form the module. In the modular design, different battery management functions can be realized on a module or submodule level, which provides favorable aspects, such as improved interchangeability.

To form a battery system, one or more battery modules are mechanically and electrically integrated, equipped with a thermal management system, and configured to communicate with one or more electrical consumers. Further, the battery system may include an electronics assembly, such as a battery management unit (BMU) and/or a battery disconnect unit (BDU).

The above information disclosed in this Background section is only for enhancement of understanding of the background of the described technology and therefore it may contain information that does not form the prior art.

SUMMARY

One or more of the drawbacks of the prior art are avoided or reduced by a battery submodule carrier, a battery submodule, a battery module, and a vehicle according to embodiments of the present invention.

According to some embodiments of the present invention, a battery submodule carrier includes a monolithic cell tray configured to accommodate a plurality of aligned battery cells, a plurality of cell retainers configured to retain the battery cells within the cell tray, and a plurality of tray fasteners configured to mount the cell tray to a battery system carrier. The battery submodule carrier according to some embodiments of the present invention includes the monolithic cell tray, and thus, assembly of a battery submodule basically consists of inserting the secondary battery cells into the monolithic cell tray. Thus, assembling of the battery submodule is relatively fast and easy.

Further, in some embodiments, the battery cells are configured to be retained in the cell tray via the cell retainers. In some embodiments, the cell retainers are configured to retain the plurality of all of the secondary battery cells inserted into the cell tray at once. In some embodiments, the cell retainers are configured to retain individual battery cells or groups (e.g., groups of 2-4 battery cells) of the plurality of battery cells accommodated in the cell tray. Thus, failed battery cells can be removed and replaced individually or by removing a relatively small number of the secondary battery cells.

The tray fasteners for mounting the cell tray to a battery system carrier are configured to attach the cell tray that is filled with the battery cells (e.g., a battery submodule) to a battery system carrier. The battery system carrier provides mechanical integrity and stability to the battery module. In some embodiments, the tray fasteners are configured for assembling a plurality of the cell trays filled with the battery cells to each other in order to form a battery module. To provide a lightweight and easy to manufacture cell tray, in some embodiments, the battery module may include a battery system carrier to provide improved mechanical integrity. The tray fasteners may include one or more protrusions extending from one or more surfaces of the cell tray (e.g., side surfaces of the cell tray) and may include connectors (e.g., screw holes and/or hooks) to be coupled to corresponding connectors of the battery system carrier.

In some embodiments, the cell tray, the cell retainers, and the tray fasteners are a monolithic unit. For example, a one-block component is configured to accommodate a plurality of aligned battery cells, to retain the battery cells therein, and to be mounted to a battery system carrier. Thus, the assembly and disassembly of battery submodules and battery modules is relatively simple and quick. In some embodiments, the cell tray, the cell retainers, and the tray fasteners are injection molded from an electrically nonconductive polymeric material. Thus, the submodule carrier can be easily and cost-effectively manufactured in large quantities and essentially in a one-step process. In these embodiments, material costs and costs for manufacturing the battery submodule carrier, battery submodules, and modules are reduced.

In some embodiments, the cell tray of the battery submodule carrier is configured to accommodate a plurality of prismatic battery cells, each of the battery cells having two opposing wide side surfaces, two opposing narrow side surfaces, and opposing top and bottom surfaces. The plurality of battery cells may be stacked together with their wide surfaces facing each other. Such stacking of the prismatic battery cells provides an essentially rectangular shape. For example, the cell tray according to embodiments of the present invention is configured to accommodate a rectangular block of stacked secondary battery cells. In some embodiments, each cell tray is configured to receive one stack of secondary battery cells. For the sake of material efficiency, the cell tray may also have an essentially rectangular shape. Battery submodule carriers according to these embodiments are space-saving, and a plurality of battery submodule carriers can be easily arranged in a common plane or stacked above each other in multiple levels.

In some embodiments, the cell tray of the battery submodule carrier has an essentially U-shaped cross section that is configured to accommodate, along a width direction thereof, a plurality of prismatic battery cells. For example, the cell tray is configured to accommodate the battery cells by inserting them through the open side of the U-shaped cross section. For example, the cell tray is configured to accommodate the battery cells by inserting them into the cell tray in a direction perpendicular to the stacking direction of the resulting stack of the battery cells. The snuggly-fitting side walls of the cell tray are configured to provide retaining forces onto the cells, and thus, the cell tray can be relatively compact.

In some embodiments of the battery submodule carrier, the cell tray includes a bottom surface having a central opening that extends along a longitudinal direction of the cell tray (e.g., along the stacking direction of the plurality of stacked battery cells). In the cell tray having the essentially U-shaped cross section, the bottom surface is the surface opposite to the open side of the U-shape. By providing the central opening, material costs and weight of the cell tray can be further reduced. The central opening can further provide a vent route aligned with vent openings of the battery cells or to provide a cooling interface (e.g., to allow the accommodated battery cells to be in close contact with a coolant channel).

In some embodiments, the cell tray includes a bottom surface including a first ledge perpendicularly protruding inwardly from a first side surface of the cell tray and a second ledge perpendicularly protruding inwardly from a second side surface of the cell tray. For example, the cell tray has an essentially H-shaped cross section having two ledges protruding inwardly from the long legs of the H-shape and being essentially parallel to the horizontal line of the H-shape. In some embodiments, the first ledge and the second ledge are configured to support a plurality of the aligned prismatic battery cells. For example, the first ledge and the second ledge together provide sufficient mechanical support to hold the plurality of battery cells accommodated in the cell tray, at least in one direction.

In some embodiments of the battery submodule carrier, the cell tray includes a first side surface and a second side surface. The first side surface is configured to extend along first narrow side surfaces of the plurality of battery cells (e.g., along the plurality of first narrow side surfaces of battery cells accommodated in the cell tray). The first side surface has a first lower portion configured to cover the first narrow side surfaces and a first upper portion. The second side surface is configured to extend along second narrow side surfaces of the plurality of battery cells (e.g., along the plurality of second narrow side surfaces of battery cells accommodated in the cell tray). The second side surface has a second lower portion configured to cover the second narrow side surfaces and a second upper portion. At least one of the upper portions of the side surfaces (e.g., at least one of the first upper portion and the second upper portion) includes spaced apart snap segments extending upwardly from the respective lower portion. Each of the snap segments is elastically connected to the respective lower portion and is configured as a cell retainer by providing a clip closure with at least one of the battery cells accommodated in the cell tray.

In some embodiments, the elastic connection is provided by a local necking of the respective side surface at the transition from the lower portion into the snap segment. In some embodiments, the clip closure is provided by the snap segments including protruding features that are shape-fitted to gaps or recesses in the cases of the secondary battery cells, such as in the top sides of the secondary battery cells. In some embodiments, the snap segments have a first segment and a second segment. The first segment may be essentially parallel to the side surface of the cell tray and/or may extend essentially along a narrow side surface of the battery cell accommodated in the cell tray, and the second segment may be angled with respect to the first segment, may extend generally along a top surface of the battery cell accommodated by the cell tray, and/or may contact the top surface of the battery cell accommodated by the cell tray. The second segment may include a protruding hook that interlocks with a corresponding feature on the top side of the accommodated battery cell. In some embodiments, the cell tray is manufactured with preloaded snap segments that are configured to bend to permit insertion of the secondary battery cell into the cell tray and, in their neutral position, are configured to retain the inserted battery cell.

In some embodiments of the battery submodule carrier, the cell tray includes a first end surface configured to cover or substantially cover a wide side surface of a first outermost battery cell and a second end surface configured to cover or substantially cover a wide side surface of a second outermost battery cell. At least one of the first end surface and the second end surface may include a reinforcing structure. However, in some embodiments, the side surfaces and the bottom surface of the cell tray may include reinforcing structures. The cell tray may be configured to fix the battery cells and other parts during assembly and operation, while mechanical loads are supported by the battery's frame and/or by the battery system carrier. However, in some embodiments, the cell tray itself is configured to absorb mechanical loads. The cell tray may absorb kinetic energy in the event of an impact, for example, during a vehicle crash. Battery cells should also be restricted from swelling or excessively swelling. The cell tray may include reinforcing structures to absorb the swelling or to restrict the swelling. In some embodiments, the reinforcing structure is a honeycomb structure.

Another embodiment of the present invention provides a battery submodule including a battery submodule carrier according to an embodiment of the present invention and a plurality of the aligned battery cells in the cell tray. In some embodiments, the battery cells are retained in the cell tray by the cell retainers that are, in some embodiments, monolithic with the cell tray.

Another embodiment of the present invention provides a battery system including a battery system carrier and the plurality of battery submodules as described above (e.g., a plurality of the battery submodules including the battery submodule carrier according to an embodiment of the present invention). The tray fasteners may be attached to the battery system carrier. In some embodiments, the tray fasteners are monolithic with the cell tray. The battery system carrier is configured to improve the mechanical integrity of the plurality of battery submodules and may further include compartments for a battery management system, components for interconnecting the battery submodules, external ports to contact the submodules, and components for attaching the module carrier to another structure, for example, to a vehicle.

In some embodiments of the battery system, the battery system carrier includes a plurality of longitudinal beams and a plurality of crossbeams. The longitudinal beams and the crossbeams constitute a carrier frame. The module carrier may further include a ground plate attached to the carrier frame. In other embodiments, a bottom side of the battery system is formed by the bottom sides of the cell trays of the plurality of battery submodules. The battery system carrier may further include a plurality of support beams that are attached to the ground plate and/or to the longitudinal beams or the crossbeams. The crossbeams may be parallel to the longitudinal beams or the crossbeams. According to these embodiments, the tray fasteners are attached to the support beams. In some embodiments, each battery submodule in the battery system is arranged between two adjacent support beams and each submodule includes tray fasteners protruding outwardly from both side surfaces of the cell tray.

In some embodiments of the battery system, a coolant channel is integrally formed in the ground plate of the battery system or is attached to the ground plate of the battery system. The coolant channel forms multiple cooling areas (e.g., heat exchange areas) which may include a plurality of windings of the coolant channel. In some embodiments, each submodule may include a cell tray that has a bottom surface having a central opening extending along a longitudinal direction of the cell tray. In some embodiments, each of the central openings is aligned with one of the cooling areas to form a cooling interface for the respective battery submodule. In some embodiments, the battery system may include one cooling area for each battery submodule.

Another embodiment of the present invention provides a vehicle including a battery system according to an embodiment of the present invention as described above, a battery submodule according to an embodiment of the present invention as described above, and/or a battery submodule carrier according to an embodiment of the present invention as described above.

Further aspects of the present invention will become apparent from the attached drawings and/or the following description of the attached drawings.

BRIEF DESCRIPTION OF THE DRAWINGS

Features of the present invention will become apparent to those of ordinary skill in the art by describing, in detail, exemplary embodiments thereof with reference to the attached drawings, in which.

DETAILED DESCRIPTION

Hereinafter, example embodiments of the present invention will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

It will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

For the electrical integration in a battery module having the modular design, either submodules including a plurality of cells connected to each other in parallel are connected to each other in series (XsYp) or submodules including a plurality of cells connected to each other in series are connected to each other in parallel (XpYs). XsYp-type submodules can generate relatively high voltages, but the voltage level of each individual cell has to be individually controlled. Thus, wiring complexity is relatively high in XsYp-type submodules. In XpYs-type submodules, the voltage levels of the cells connected to each other in parallel are automatically balanced, and thus, it is sufficient to control the voltage on the submodule level. Thus, wiring complexity is reduced in XpYs-type submodules. In the submodules of cells connected to each other in parallel, their capacitance adds up, and thus, XpYs-type submodules are generally used with low capacitance cells.

The thermal management system allows for safe use the battery module by efficiently emitting, discharging, and/or dissipating heat generated by the rechargeable batteries. If the heat emission/discharge/dissipation is not sufficiently performed, temperature deviations occur between the respective battery cells, such that the battery module cannot generate a desired amount of power. In addition, an increase of internal temperatures of the rechargeable batteries can lead to abnormal reactions occurring therein, thus causing charging and discharging performance of the rechargeable batteries to deteriorate and the life-span of the rechargeable batteries to be shortened. Thus, cooling devices for effectively emitting/discharging/dissipating heat from the cells are often provided.

To meet the dynamic power demands of various electrical consumers (e.g., electrical consumption circuits or devices) connected to the battery system, static control of battery power output and charging may not be sufficient. Thus, a steady exchange of information between the battery system and the controllers of the electrical consumers may be implemented. Important information, such as the battery system's actual state of charge (SoC), potential electrical performance, charging ability, and internal resistance, as well as actual or predicted power demands or surpluses of the consumers, may be communicated.

Mechanical integration of the battery module refers to mechanical connections of the individual components among themselves and to a structure of the powered system (e.g., the system providing the electrical information, such as a vehicle). These connections should be designed such that they remain functional and safe during the average service life of the battery system and under the stresses endured during use of the powered device (e.g., the vehicle). Also, installation space and interchangeability requirements should be considered, especially in mobile applications.

Mechanical integration of battery modules can be achieved by providing a carrier plate (e.g., a ground plate) and by positioning individual battery cells or submodules thereon. Fixing the battery cells or submodules to the carrier plate can be achieved by fitting the battery cells or submodules into depressions in the carrier plate, by mechanical interconnectors, such as bolts or screws, or by confining the cells or submodules. Confinement can be achieved by fastening side plates to lateral sides of the carrier plate and/or by providing a second carrier plate atop the battery cells or submodules and fixing it to the first carrier plate and/or side plates. Thus, multilevel battery modules can be constructed, and the carrier plates and/or side plates may include coolant ducts to cool the cells or submodules.

Mechanical integration of battery submodules may generally be achieved by preassembling a plurality of battery cells and connecting them to each other with mechanically reinforced electrical connectors, by fastening side and/or front plates around the battery cells, or by attaching carrier beams or struts to the electrical connectors and to the battery cells.

Figure 1:
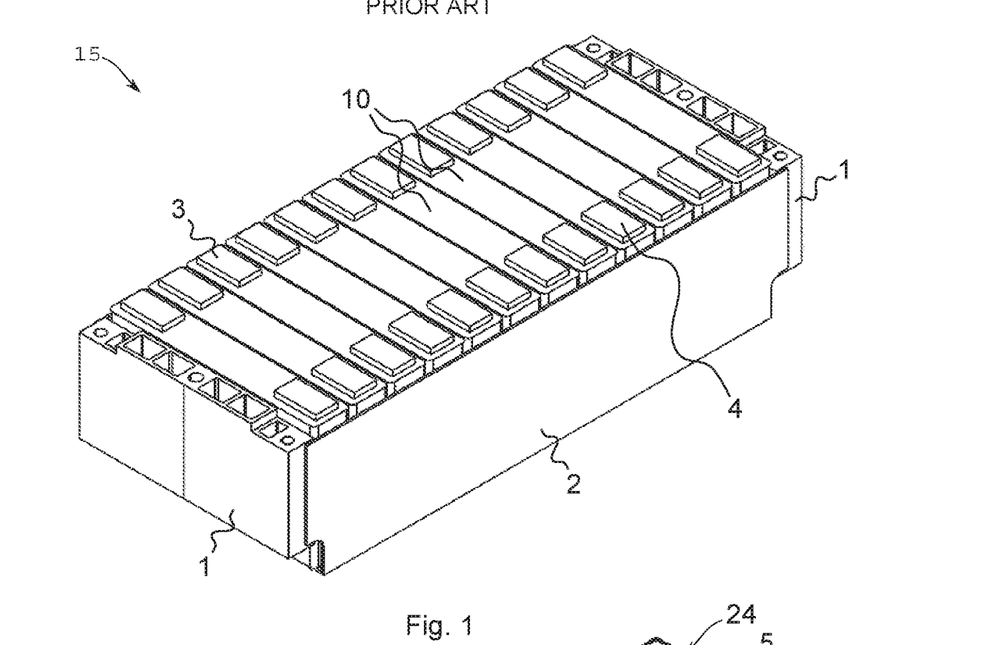
FIG. 1 is a perspective view of a battery submodule according to the prior art.

Referring to FIG. 1, a battery submodule 15 includes a plurality of aligned secondary battery cells 10, each having a substantially prismatic shape. Each of the battery cells 10 includes a positive terminal 3, a negative terminal 4, and a vent opening 5 (e.g., a vent hole). A pair of module front plates 1 is provided to face front surfaces (e.g., wide surfaces) of the battery cells 10 (e.g., to face front surfaces of the outermost ones of the battery cells 10). The module front plates 1 are mechanically coupled to a pair of module side plates 2 that face side surfaces (e.g., narrow side surfaces) of the battery cells 10. The module front plates 1 and the module side plates 2 are assembled to each other to fix the plurality of battery cells 10 together. Thereby the plurality of battery cells 10 is fixed together. The battery submodule may further include a pair of module top plates that are mechanically coupled to the module front and side plates 1, 2. The module front plates 1, the module side plates 2, and the module top plates together provide a self-supporting body of the battery submodule 100.

The number of battery cells in usual battery modules can reach several hundred cells, and thus, a relative great number of battery submodules may be included in the battery module. The effort to assemble the plurality of battery submodules prior to assembling the battery module is a material and time-intensive process that increases the manufacturing costs of the battery module. Further, the failure and subsequent replacement of a single battery cell in the battery module requires removal of the battery submodule from the battery module and disassembly of the battery submodule, such that the battery module loses its mechanical integrity during that process.

Figure 2:
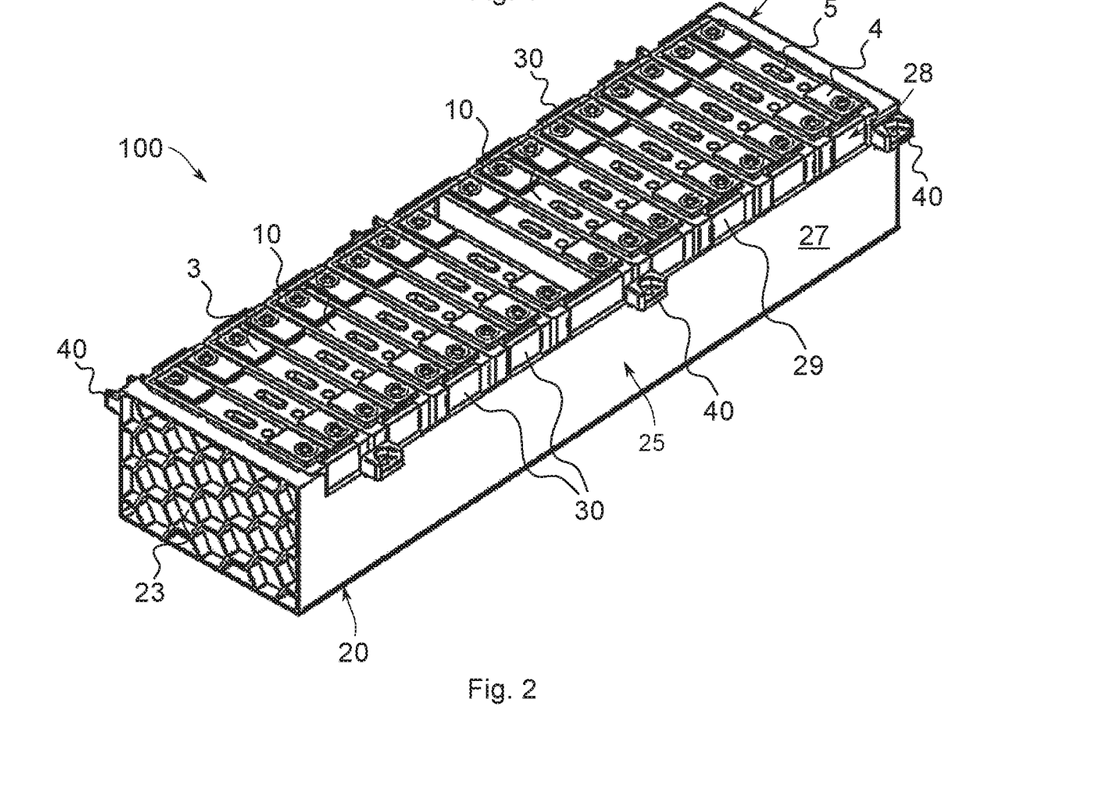
FIG. 2 is a perspective view of a battery submodule according to an embodiment of the present invention.

Referring to FIG. 2, an exemplary embodiment of a battery submodule 100 according to the present invention includes a plurality of aligned secondary battery cells 10, each having a substantially prismatic shape, that are inserted into (or accommodated in) a battery submodule carrier. As shown in FIG. 2, each of the battery cells 10 is a prismatic (or rectangular) cell, and wide, flat side surfaces of the cells 10 are stacked together (e.g., are stacked to face each other)

to form the battery submodule 100. Further, each of the battery cells 10 includes a battery case configured to accommodate an electrode assembly and an electrolyte. The battery case is hermetically sealed and is provided with positive and negative electrode terminals 3 and 4 having different polarities from each other and a vent opening 5 (e.g., a vent hole). The vent opening 5 is a safety device of the battery cell 10 and acts as a passage through which gas generated in the battery cell 10 is exhausted to the outside of the battery cell 10. In order to avoid any unwanted electric contact between the individual battery cells 10, isolation foils are disposed between adjacent ones of the battery cells 10.

The battery submodule carrier includes a cell tray 20 having a first side surface (e.g., a wide surface) 25 and an opposite second side surface 26, a first end surface 23 and an opposite second end surface 24, an open top surface (e.g., an open top side) and a bottom surface. The first side surface 25 includes a lower portion 27 covering the narrow side surfaces of the battery cells 10 that are inserted in the cell tray 20 and further includes an upper portion 28 including (e.g., consisting of) a plurality of cell retainers 30, such as spaced apart snap segments 29. Thus, the upper portion 28 of the first side surface 25 is segmented by the snap segments 29, and recesses are between adjacent ones of the snap segments 29. The second side surface 26 includes a structure similar to the first side surface 25. The submodule battery carrier further includes tray fasteners 40 that protrude from the side surfaces (e.g., from the first side surface 25 and the second side surface 26) of the cell tray 20 and, in some embodiments, are positioned at the transition between the lower portion 27 and the upper portion 28 of the side surfaces 25, 26. The tray fasteners 40 may include screw holes that are configured to be aligned with corresponding connectors, such as screws, of a battery system carrier.

Figure 3:
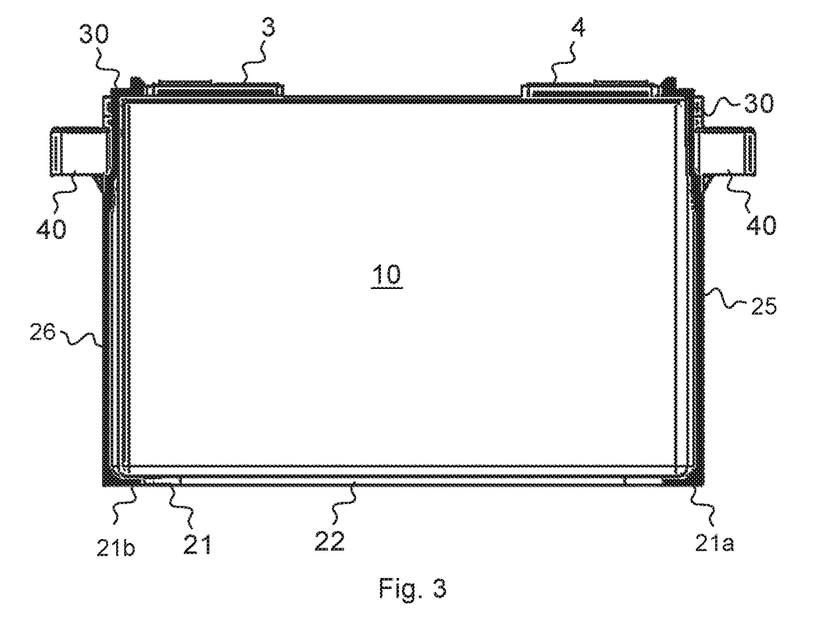
FIG. 3 is a cross-sectional view of a battery submodule according to an embodiment of the present invention.

Referring to FIGS. 2 and 3, the battery cells 10 are inserted into the cell tray 20 through the open top side such that the wide side surfaces of the battery cells 10 are adjacent to each together, and the battery cells 10 are retained in the cell tray 20 by the snap segments 29. The snap segments 29 are formed, pre-stressed, from the side walls 25, 26 (e.g., side surfaces) of the cell tray 20 and are configured to bend away (e.g., to bend away from an accommodation space for the battery cells 10 in the cell tray 20) for the battery cells 10 to be inserted into the cell tray 20. In their neutral position, the snap segments 29 retain the battery cells 10. Therefore, the snap segments 29 include a first segment extending generally along the side surface of the battery cells and a second segment protruding inwardly from the first segment that generally extends along the top surface of the battery cells 10. In the embodiment illustrated in FIGS. 2 and 3, the cell tray 20, the snap segments 29, and the tray fasteners 40 are injection molded from an electrically non-conductive polymeric material and, thus, form a monolithic component.

Referring to FIG. 3, the cell tray 20 further includes a bottom surface 21 with a central opening 22 extending along a longitudinal direction of the cell tray 20, for example, perpendicular to the drawing plane of FIG. 3. The bottom surface 21 includes a first ledge 21a protruding inwardly from the first side surface 25 and a second ledge 21b protruding inwardly from the second side surface 26. The first ledge 21a and the second ledge 21b together support the battery cells 10 inserted into the cell tray 20.

Figure 4:
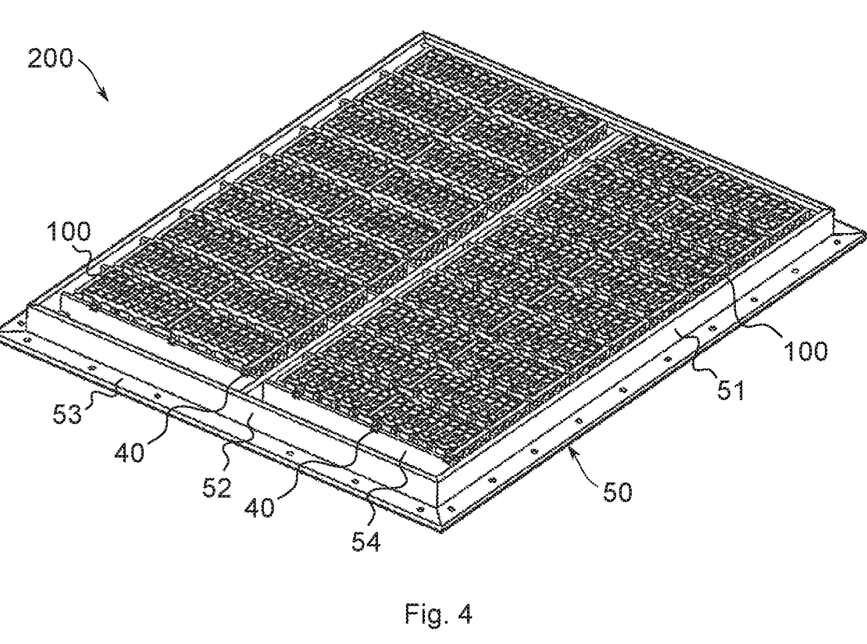
FIG. 4 is a perspective view of a battery system according to an embodiment of the present invention.

Referring to FIG. 4, a battery system 200 according to an embodiment of the present invention includes a plurality of the battery submodules 100 as illustrated in FIGS. 2 and 3. A plurality of rows (e.g., two rows) of the battery submodules 100, each row including a plurality of the battery submodules 100, are disposed in a battery system carrier 50. The battery system carrier 50 includes a plurality of longitudinal beams 51 (e.g., two longitudinal beams 51) and a plurality of crossbeams 52 (e.g., two crossbeams 52) welded together to form a carrier frame. A ground plate 53 is welded to the carrier frame. The battery system carrier 50 further includes a plurality of support beams 54, and the tray fasteners 40 of each of the battery submodules 100 are attached to the support beams 54.

Figure 5:
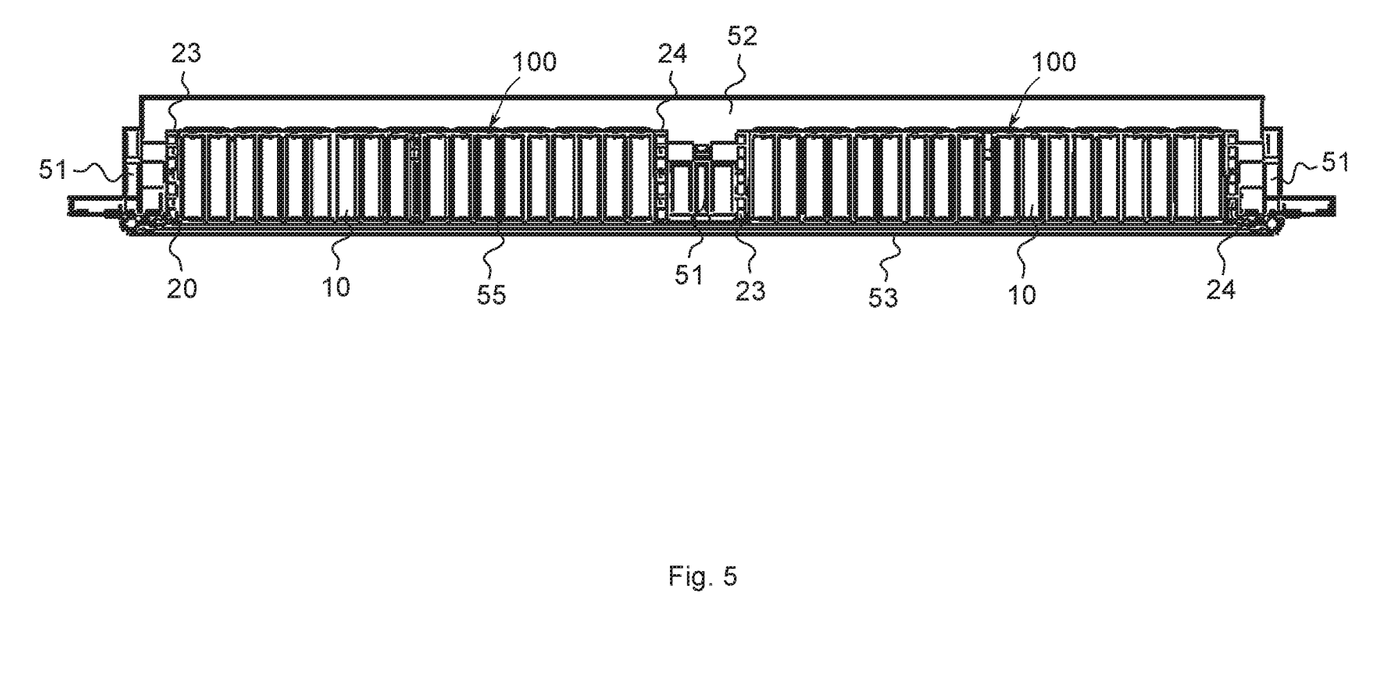
FIG. 5 is a cross-sectional view of a battery system according to an embodiment of the present invention.

Referring to FIGS. 4 and 5, the ground plate 53 of the battery system carrier 50 includes a coolant channel 55 as an integral part (e.g., the coolant channel 55 is integrally formed in the ground plate 53). The coolant channel 55 forms cooling areas at where the coolant channel 55 has a plurality of windings for providing a large heat exchange surface. The battery submodules 100 are arranged in the battery system carrier 50 such that the central openings 22 of the cell trays 20 are aligned with the cooling areas formed by the coolant channel 55. In other embodiments, the coolant channels may be external coolant channels that are attached to the battery system carrier 50.

SOME OF THE REFERENCE NUMERALS 1 module front plate
2 module side plate
3 positive terminal
4 negative terminal
5 vent hole
10 secondary battery
15 battery submodule
20 cell tray
21 bottom surface
21a first ledge
21b second ledge
22 central opening
23 first end surface
24 second end surface
25 first side surface
26 second side surface
27 lower portion (of 26)
28 upper portion (of 26)
29 snap segment (of 26)
30 cell retainer
40 tray fastener
50 battery system carrier
51 longitudinal beam
52 crossbeam
53 ground plate
54 support beam
55 coolant channel
100 battery submodule
200 battery system

What is claimed is:

1. A battery submodule carrier comprising:
   a monolithic cell tray configured to accommodate a plurality of aligned battery cells, the monolithic cell tray comprising a first side surface having a first lower portion and a first upper portion, a second side surface opposite the first side surface and having a second lower portion and a second upper portion, a first end surface at one end of the first and second side surfaces, a second end surface at another end of the first and second side surfaces, and a bottom surface extending from ends of the first side surface, the second side surface, the first end surface, and the second end surface and having a central opening extending along a longitudinal direction of the cell tray;
a plurality of cell retainers configured to retain the battery cells within the cell tray, the cell retainers being spaced apart snap segments that extend upwardly from distal ends of the first lower portion and the second lower portion to respectively form the first upper portion and the second upper portion and being elastically connected to the respective first lower portion and second lower portion, the snap segments being configured to provide clip engagement with at least one of the battery cells accommodated in the cell tray; and
a plurality of tray fasteners configured to mount the cell tray to a battery system carrier.

2. The battery submodule carrier according to claim 1, wherein the cell tray, the cell retainers, and the tray fasteners are a monolithic unit.

3. The battery submodule carrier according to claim 2, wherein the cell tray, the cell retainers, and/or the tray fasteners are injection molded from an electrically nonconductive polymeric material.

4. The battery submodule carrier according to claim 1, wherein each of the battery cells has two opposing wide side surfaces, two opposing narrow side surfaces, and opposing top and bottom surfaces, and
wherein, in the cell tray, the battery cells are stacked together with their wide surfaces facing each other.

5. The battery submodule carrier according to claim 1, wherein the cell tray has a U-shaped cross section configured to accommodate the battery cells.

6. The battery submodule carrier according to claim 1, wherein the cell tray further comprises a first ledge perpendicularly protruding inwardly from the first side surface, and a second ledge perpendicularly protruding inwardly from the second side surface, and
wherein the first ledge and the second ledge are configured to support the battery cells.

7. The battery submodule carrier according to claim 1, wherein at least one of the first end surface and the second end surface comprises a reinforcing structure.

8. The battery submodule carrier according to claim 7, wherein the reinforcing structure comprises a honeycomb structure.

9. A battery submodule comprising:
the battery submodule carrier according to claim 1; and
the plurality of aligned battery cells in the cell tray.

10. A battery system comprising:
a battery system carrier; and
a plurality of the battery submodules according to claim 9,
wherein the tray fasteners of the battery submodule carriers are attached to the battery system carrier.

11. The battery system according to claim 10,
wherein the battery system carrier comprises a plurality of longitudinal beams, a plurality of crossbeams, a ground plate, and a plurality of support beams,
wherein the support beams are attached to the ground plate, the longitudinal beams, and/or the crossbeams, and
wherein the tray fasteners of the battery submodule carriers are attached to the support beams.

12. The battery system according to claim 11,
wherein a coolant channel is integrally formed in the ground plate and forms a plurality of cooling areas, and
wherein the central opening in the bottom surface is aligned with at least one of the cooling areas to form a cooling interface for the respective at least one of the battery submodules.

13. The battery system according to claim 11,
wherein a coolant channel is attached to the ground plate and forms a plurality of cooling areas, and
wherein the central opening in the bottom surface is aligned with one at least of the cooling areas to form a cooling interface for the respective at least one of the battery submodules.

14. A vehicle comprising:
the battery system according to claim 10; and
the battery submodule according to claim 9.

15. A vehicle comprising:
the battery system according to claim 10; and
the battery submodule carrier according to claim 1.

16. The battery submodule carrier according to claim 1, wherein the cell retainers contact the battery cells.

17. The battery submodule carrier according to claim 1, wherein the cell tray, the cell retainers, and the tray fasteners are a monolithic unit,
wherein the cell retainers extend from the first side surface of the cell tray, and
wherein a thickness of the cell retainer is smaller than a thickness of the first side surface.

18. The battery submodule carrier according to claim 17,
wherein each of the battery cells has two opposing wide side surfaces, two opposing narrow side surfaces, and opposing top and bottom surfaces,
wherein, in the cell tray, the battery cells are stacked together with their wide surfaces facing each other, and
wherein each of the cell retainers contacts two adjacent ones of the battery cells.

19. The battery submodule carrier according to claim 1, wherein an upper surface of the cell retainers is coplanar with an upper surface of the first side surface and the second side surface.

* * * * *